(No Model.) 5 Sheets—Sheet 1.
C. S. LONG.
MACHINE FOR PRESSING PLASTIC MATERIAL.
No. 354,604. Patented Dec. 21, 1886.
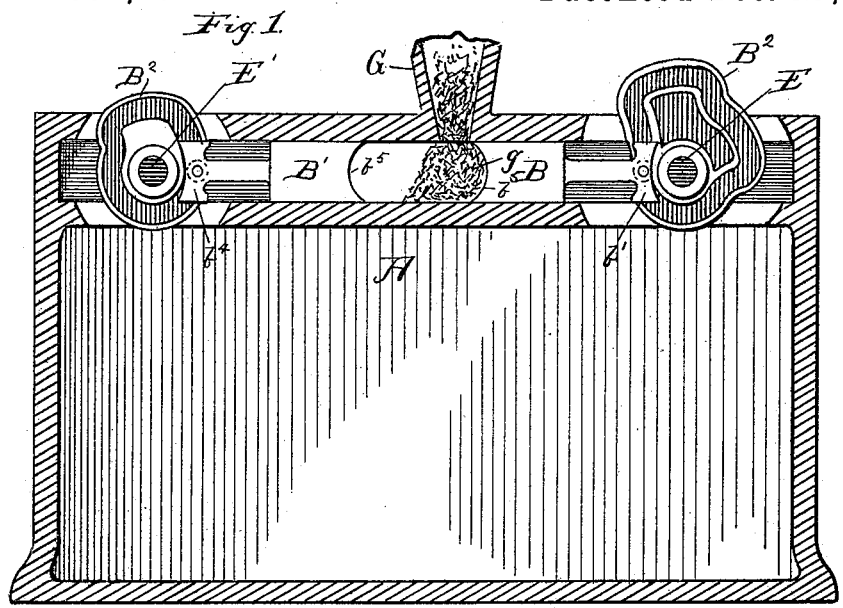
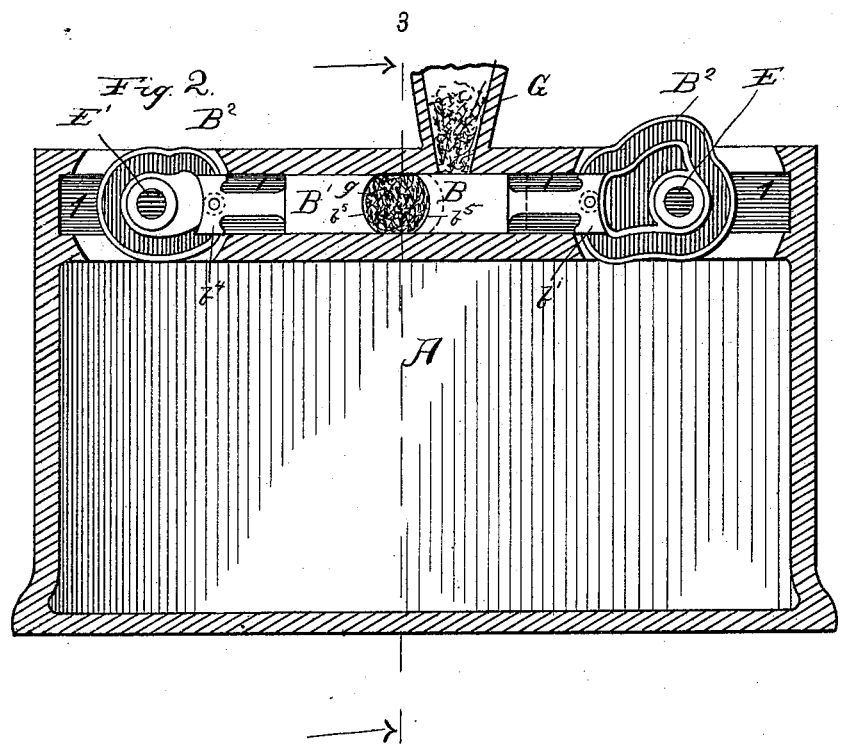
Witnesses:
Lew. E. Curtis.
Oscar M. Tanner.
Inventor:
Charles S. Long (No Model.) 5 Sheets—Sheet 2.

C. S. LONG.
MACHINE FOR PRESSING PLASTIC MATERIAL.

No. 354,604. Patented Dec. 21, 1886.

Witnesses:
Lew. E. Curtis.
Oscar M. Jannet

Inventor:
Charles S. Long (No Model.) 5 Sheets—Sheet 3.
C. S. LONG.
MACHINE FOR PRESSING PLASTIC MATERIAL.
No. 354,604. Patented Dec. 21, 1886.
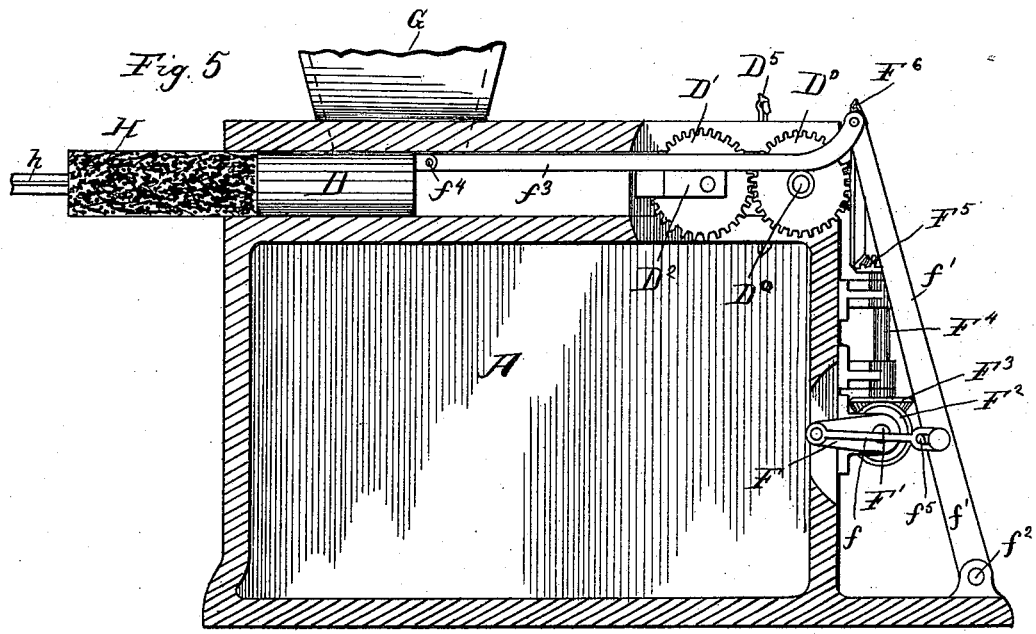
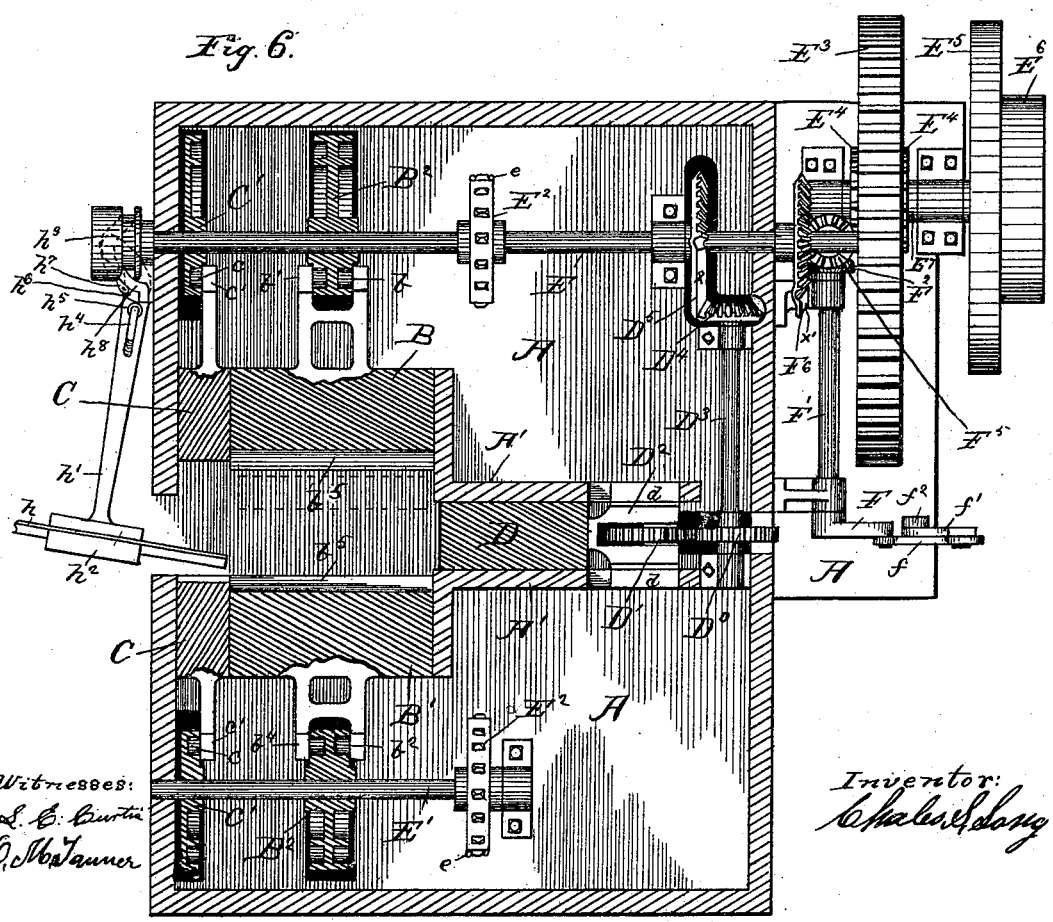

(No Model.) 5 Sheets—Sheet 4.
C. S. LONG.
MACHINE FOR PRESSING PLASTIC MATERIAL.
No. 354,604. Patented Dec. 21, 1886.
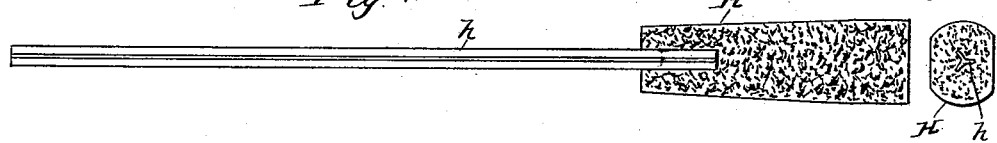
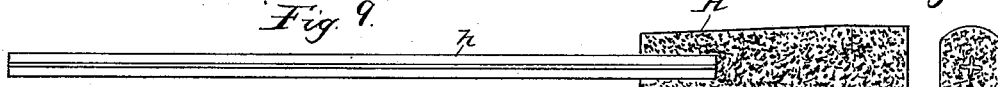
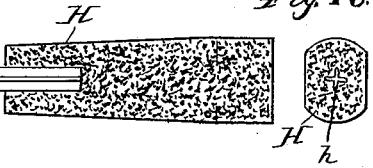
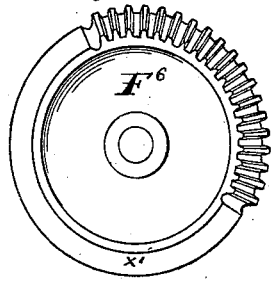
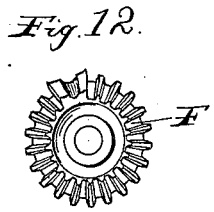
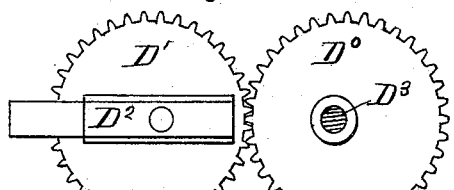
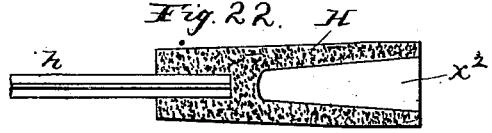
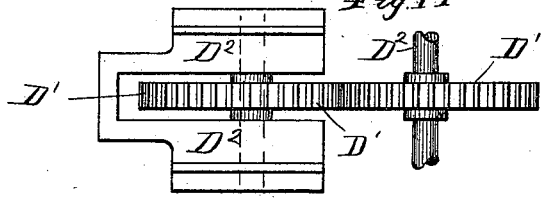
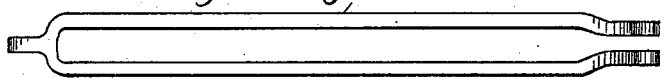
Witnesses:
Lew. E. Curtis
Oscar M. Tanner
Inventor:
Charles S. Long

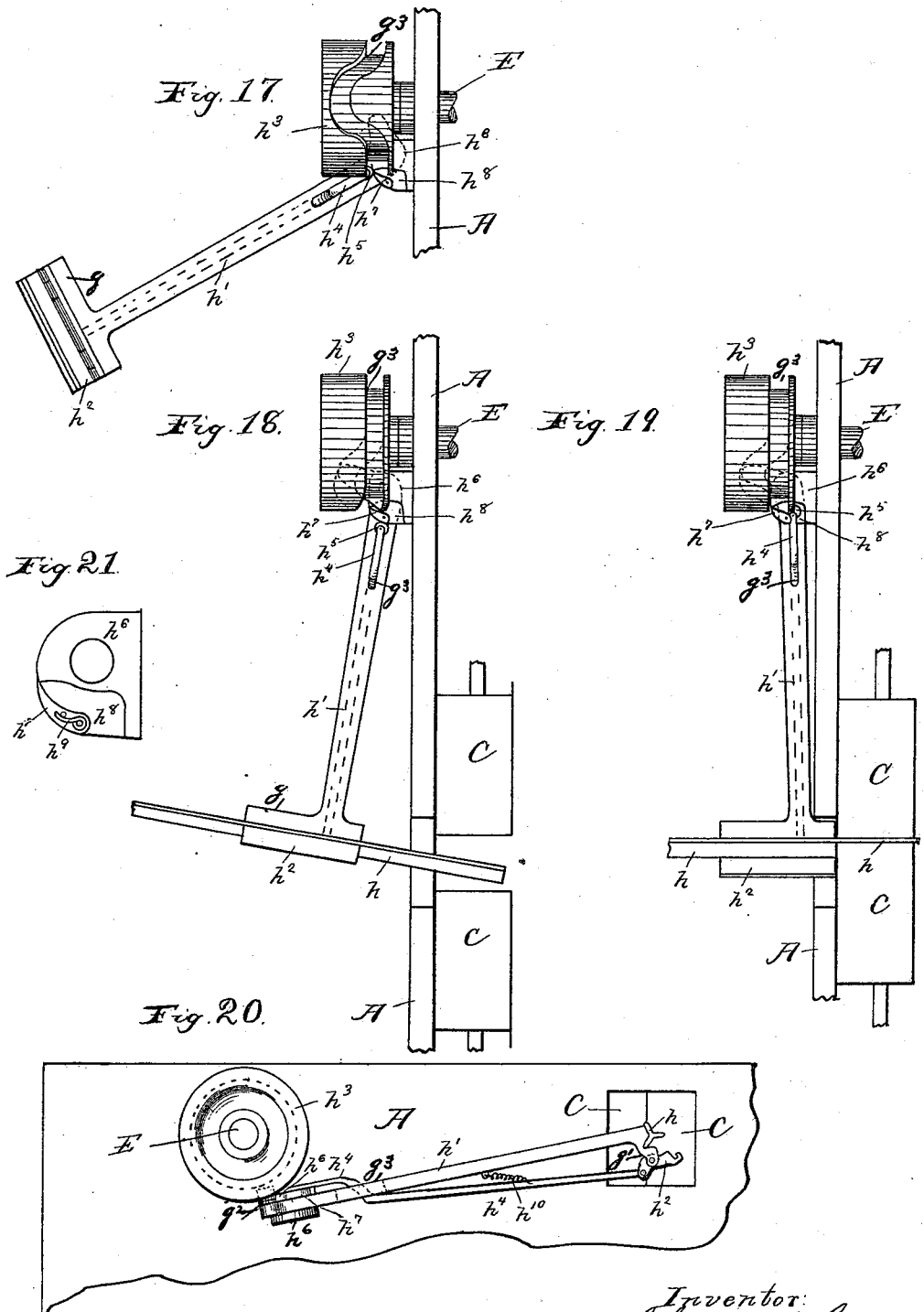

UNITED STATES PATENT OFFICE.

CHARLES S. LONG, OF HINCKLEY, ILLINOIS.

MACHINE FOR PRESSING PLASTIC MATERIAL.

SPECIFICATION forming part of Letters Patent No. 354,604, dated December 21, 1886.

Application filed July 3, 1886. Serial No. 207,054. (No model.)

*To all whom it may concern:*

Be it known that I, CHARLES S. LONG, a citizen of the United States, residing at Hinckley, in the county of De Kalb and State of Illinois, have invented certain new and useful Improvements in Machines for Pressing Plastic Material into Form; and I do hereby declare the following to be a full, clear, and exact description of the invention, such as will enable others skilled in the art to which it appertains to make and use the same.

My invention relates to improvements in machines for pressing plastic substances into form.

The object of my invention is to provide a machine which will press an asphaltic or other concrete base around the bottom of a fence-post or other like object, by which the same may be firmly anchored in the ground.

My invention consists in a machine for pressing asphalt or other concrete, or clay or other material, onto the end of a fence-post or other article which is to be placed in the ground, so as to form a base or anchor by which the same is held securely in position.

My invention consists, further, of a mold having movable sides and end sections which press and confine the material during such pressure, said sections being retracted after the pressure, so as to allow the article to be removed from the mold.

My invention consists, further, in certain devices, which will be fully described hereinafter, by which the fence-post is automatically placed in the mold-cavity, and held securely in such position until the material has been pressed around the same.

My invention consists, further, in certain details of construction, which will be fully described hereinafter, and pointed out in the claims.

Figure 3:
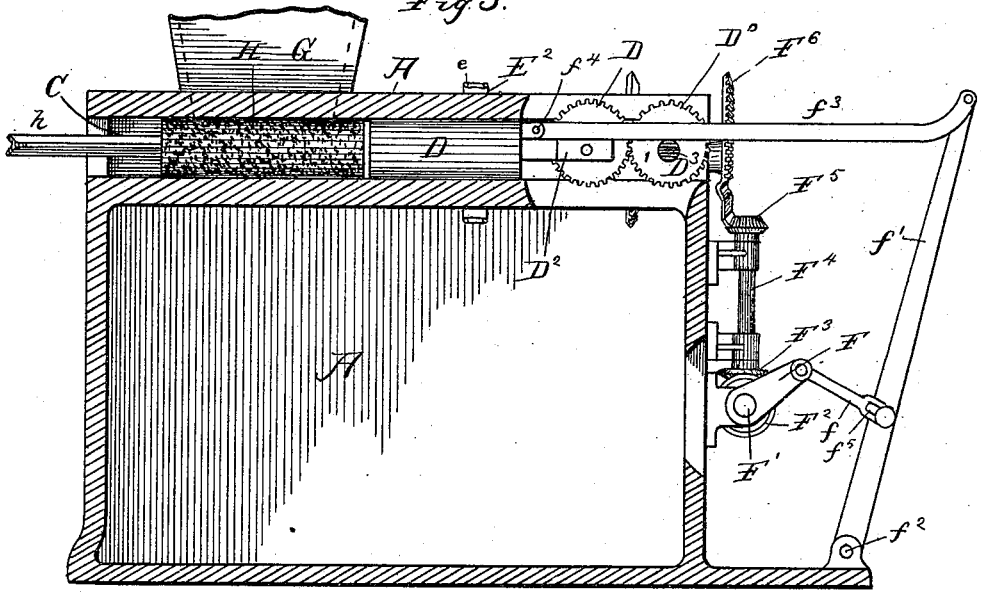
Figure 4:
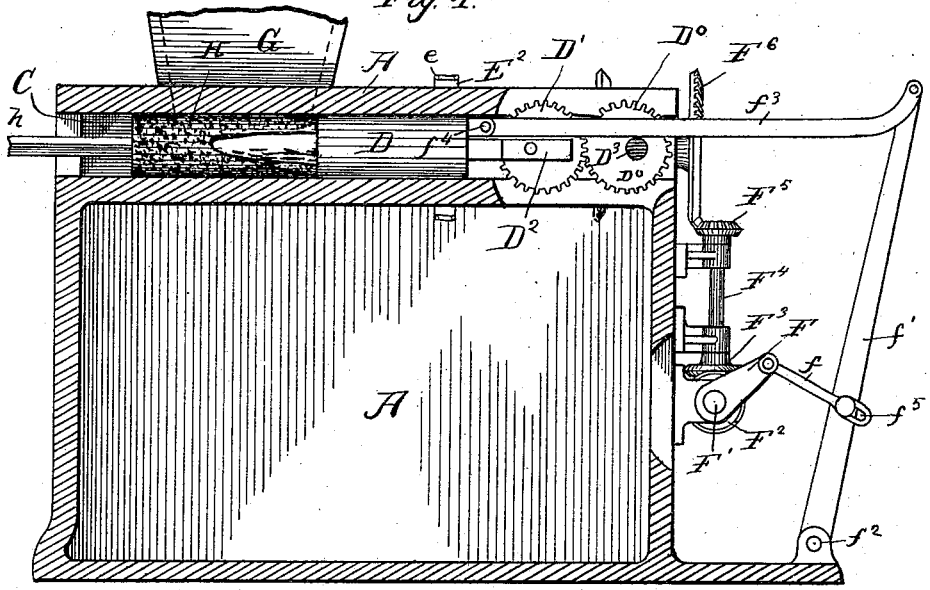

Referring to the drawings, Figure 1 is a vertical transverse sectional view of the machine, showing the side plungers drawn back and the material entering the cavity between said plungers. Fig. 2 is the same view as Fig. 1, with the plungers forward and in the act of compressing the material onto the metallic or other bar. Fig. 3 is a vertical longitudinal sectional view showing the material before the pressure has been applied. Fig. 4 is also a vertical longitudinal sectional view of the machine after the pressure has been applied. Fig. 5 is also a vertical longitudinal sectional view of the machine, with the end plunger in its extreme forward position and forcing the newly-formed article out of the mold. Fig. 6 is a horizontal sectional view on the line $x\,x$ of Fig. 5, with the plungers in position to receive the material to be compressed. Figs. 7 and 9 are longitudinal sectional views of the fence-posts and base. Figs. 8 and 10 are sectional views on the line $x'\,x'$ of Figs. 7 and 9. Fig. 11 is a front view of one of the gear-wheels, which communicates motion to the shaft which operates the side plungers. Fig. 12 is an end or front view of a pinion-wheel which operates the gear-wheel shown in Fig. 11. Figs. 13 and 14 are side and plan views of the gear-wheels which operate the end plungers, as will appear more fully hereinafter. Figs. 15 and 16 are top and side views of the pitman which connects the end plunger with the operating-lever. Figs. 17, 18, and 19 are top or plan views of the devices which feed the metal bars into the molds. Fig. 20 is a side view of the devices shown in Figs. 17, 18, and 19. Fig. 21 is a plan view of a detached portion of the devices shown in Figs. 17, 18, 19, and 20. Fig. 22 is a modification of the base and post, in which the base is shown with a cavity therein.

A indicates the frame of the machine, which may be cast in one piece, or in sections, as may be desired, and bolted together, so as to form a solid and rigid support for the operating parts of the machine. The upper portion of the frame is provided with a cavity or hollow portion, 1, of irregular form, which forms the mold-cavity, and also the housings or guides for the compression-plungers.

B and B' are the side compression-plungers, located in and adapted to move back and forth in the cavity 1, said plungers being connected to and operated by means of the eccentric disks $B^2$, having cam-grooves in their sides, which engage with friction-rollers $b\,b^2$, mounted on the extensions $b'\,b^4$, which project from the rear sides of the plungers. The faces of the plungers B B' are made concave, as shown at $b^5\,b^5$.

C C are sliding blocks, adapted to close the rear end of the cavity 1, so as to form one end of the mold-box, said blocks being formed with suitable recesses in their face, which will permit the metallic or other bar to enter the mold-cavity and to hold the same in a central position while the base is being pressed on the bar. The rear ends of the sliding blocks C C are provided with extensions $c'$ $c'$, on which are mounted the friction-wheels $c\,c$, said wheels being adapted to engage with cam-grooves formed in the sides of the eccentric disks C' C', and by which means the blocks C C are moved back and forth to open and close the end of the mold-cavity.

D is a compression and ejection plunger, located in the rear end of the cavity 1, and is designed to close the rear end of the mold-cavity, and also to compress the article.

$D^2$ is a cross-head, provided with flanges or side extensions, $d\,d$, adapting it to slide in guideways formed in the side walls of the cavity 1, said cross-head being adapted to impinge on the rear end of the plunger D, and force the same forward at the proper time to compress the article.

D' is a spur-gear mounted in suitable bearings in the cross $D^2$, and adapted to mesh with a similar spur-wheel, $D^0$, mounted on the shaft $D^3$, said spur-wheel $D^0$ being hung eccentric to its center on said shaft, as shown in Figs. 3 and 4, so that when the wider portion of this pinion-wheel comes around to the pinion-wheel D' it will be pushed forward, carrying with it the cross-head $D^2$ and plunger D, and in this way effect the compression of the end portion of the article.

As before stated, $D^3$ is a shaft mounted in suitable bearings, one end of which is provided with a beveled gear-wheel, $D^4$, which meshes with a mutilated beveled spur-wheel secured on the shaft E, said shaft E being also provided with the sprocket-wheel $e$ and the grooved eccentric disks $B^2$ and C', which operate the side plunger B, and also one of the sliding blocks C, heretofore described.

E' is a shaft mounted in suitable bearings on the other side of the machine, on which is also secured a sprocket-wheel, $e$, the sprocket-wheels on the shafts E and E' being connected by a suitable sprocket-chain, (not shown,) by which motion is imparted from the shaft E to the shaft E'. The shaft E' is also provided with the eccentric grooved disks $B^2$ and C', which operate the side plunger B', and also the other sliding block C.

$E^3$ is a spur-wheel secured to the front end of the shaft E, which meshes with a pinion-wheel, $E^4$, mounted on the main driving-shaft $E^7$, said main shaft $E^7$ being also provided with a balance or fly wheel, $E^5$, and band-wheel $E^6$, through which power is imparted to the machine from any suitable source.

F is a crank-arm secured to the end of the shaft F', said shaft being mounted in suitable brackets secured to the side of the machine, as shown in Fig. 6.

$F^2$ is a beveled gear-wheel secured to the other end of the shaft F, which meshes with a similar wheel, $F^3$, secured to the lower end of the vertical shaft $F^4$, said shaft being also mounted in suitable bearings or brackets secured to the side of the machine.

$F^5$ is a beveled gear-wheel secured to the upper end of the shaft $F^4$, and is adapted to mesh with the mutilated beveled gear-wheel $F^6$, secured to the shaft E.

$f$ is a bar or pitman, one end of which is secured to the crank-arm F, the other end of said bar being provided with a slot, $f^5$, adapted to engage a pin on the vertical bar $f'$, so that a certain period of rest will be given to the bar $f'$ between its forward and backward movement. The bar $f'$ is pivoted at its lower end to the base of the machine, as shown at $f^2$, and adapted to be moved back and forth by the rotation of the crank-arm F on the shaft F', while the upper end of the bar $f'$ is connected to the plunger D by means of the double bar $f^3$, which admits of the rotation of the pinion-wheels $D^0$ and D' between the sides or members of the double bar $f^3$. The office or function of this rocking bar is to move the plunger D forward, so as to push the newly-formed article out of the mold after the side plungers have been drawn back and the slides C removed from the end of the mold.

There is an opening formed in the top of the machine, above which is located the feed-hopper G, said hopper being designed to hold the material to be compressed. The bottom of the hopper G is closed by the side compression-plunger, B, while the article is being pressed; but when the pressing has been finished the plunger B is drawn back into the position shown in Fig. 1 and the material allowed to fall into the mold-cavity between the side plungers.

It will be noticed that the mutilated gear-wheels $D^5$ and $F^6$ are so arranged on the shaft E that they impart motion to their respective parts alternately. Thus, when the wheel $D^5$ has reached its plain or mutilated portion $x$, the plunger D has been moved forward to compress the end of the article, and the side plungers, together with the blocks C, have been moved over simultaneously therewith to form the mold and compress the material. During this time the pinion-wheel $F^2$ has been traveling over the mutilated portion $x'$ of the wheel $F^6$, and when the toothed portion of the wheel $F^6$ has been reached the shaft F' will be caused to rotate and the bar $f'$ drawn over and the plunger D thrust forward to eject the base from the mold, after which the plunger D is drawn back to the position shown in Fig. 3.

H is the article or anchor which has been pressed around the end of the metallic bar $h$, which may be of any desired shape, but preferably of the shape shown in Figs. 7, 8, 9, and 10.

The base H is made from any suitable plastic material, but preferably of a composition in which natural asphaltum is the binding material.

I find that natural asphaltum reduced to a fluid condition with crude petroleum and pulverized limestone or other hard rock give the best results, for the reason that it is impervious to moisture, and is not affected by cold or electricity.

In Fig. 22 I have shown a modified form of base, which is formed with a cavity, $x^2$, in its base, and is tapering from the base toward the top, so that the frost will not heave the base out of position. By making the base with the cavity $x^2$, I am enabled to make a good and substantial base with much less material, and the posts and base being much lighter than if the base were made solid, I am enabled to save considerable in weight and cost of transportation.

In making the hollow base just described I provide the front end of the plunger D with a cone-shaped or tapering projection, as shown in Fig. 4.

I will now proceed to describe the devices by which the bar or post is fed to the machine until it is clamped and held in the mold by the sliding blocks C C in a central position, so that the material which forms the base will be placed uniformly around said bar.

$h'$ is a bar, one end of which is pivoted to the upper side of the bracket or plate $h^6$, secured to the side of the machine, the other or outer end of said bar being provided with a jaw, $g$, adapted to conform to the wings or flanges of the post $h$, as shown in Fig. 20. The outer end of the bar $h$ is also provided with a projection, $g'$, to which the jaw $h^2$ is pivoted, said jaw $h^2$ being operated to clamp the other side of the post by devices which will be hereinafter described. The inner end of the bar $h'$ is provided with an upwardly-projecting stud, which is back of the pivot-point, and on which is secured a friction-wheel, $g^2$, adapted to engage a cam-groove, $g^3$, formed in the periphery of the wheel $h^3$, said wheel being secured to the outer end of the shaft E, so that when said wheel is rotated the cam-groove will act on the friction-wheel $g^2$ and swing the outer end of the bar $h'$ toward and from the main body of the machine.

$h^4$ is a bar, one end of which is pivoted to the jaw $h^2$, while the other end projects through a slot, $g^3$, formed in the bar $h'$.

$h^5$ is a friction-wheel pivoted in the inner end of the bar $h^4$, said friction-wheel being impinged against by the eccentric $h^7$, which is brought in contact with one of the edges of the cam-groove $g^3$, thus pushing the bar $h^4$ forward and clamping the jaw $h^2$ onto the iron bar $h$, a spring, $h^{10}$, serving to draw the bar $h^4$ back when not operated upon by the cam-groove, so as to hold the jaw $h^2$ in its open position.

The eccentric cam $h^7$ may be placed in a recess, $h^8$, in the top of the plate $h^6$, and with a spring, $h^9$, for returning the cam $h^7$ to its proper position; but in this construction it will be necessary to pivot the bar $h'$ to the under side of the plate $h^6$. In operation this portion of the machine acts as follows: When the arm $h'$ is swung around from the machine, the jaw $h^2$ is open and the metallic bar $h$ is laid therein. As the arm $h'$ begins to return toward the machine the rod $h^4$ is thrust forward and the bar clamped between the jaw $h^2$ and the shoulder in the end of the bar $h'$.

The action of the cam-groove $g^3$ on the arm $h'$ is so timed that the end of the bar will be thrust into the center of the mold-cavity until the sliding blocks C C move forward and clamp the bar and hold it firmly in such position until the material has been deposited in the mold and compressed around the end of the bar. As soon as the post is clamped between the sliding blocks the bar $h'$ will be swung back ready to receive another bar, the newly-formed post being removed in the meantime from the machine.

It is obvious that devices may be originated for tamping the material around the end of the bars, instead of by a continual pressure, as herein described, and such I esteem as coming within the spirit of my invention.

The lower end of the metal bar may be perforated, so that the plastic material can be pressed therethrough, so as to more firmly hold the same in the base; or barbs may be formed on the lower end of the bar for accomplishing the same purpose.

Having thus described my invention, what I claim, and desire to secure by Letters Patent, is—

1. In a machine for pressing plastic material onto a post or bar, the combination, with the variable mold-cavity having side plungers, an end plunger, and sliding blocks to close one end thereof, of a feed-arm operated at intervals, as set forth.

2. A press for pressing plastic material onto a post or bar, said press consisting of two side plungers and an end plunger, said plungers being operated by cams and gearing, as described, whereby the plungers are operated simultaneously, as set forth.

3. In a press or machine of the character described, the variable mold-cavity and sliding blocks C, for closing one end of the same, in combination with the side and end plungers operated by suitable means, as set forth.

4. In a press or machine of the character described, the shaft $D^3$, provided with the pinion-wheel $D^4$, adapted to engage the mutilated gear-wheel D, and with the eccentric pinion-wheel $D^6$, in combination with the pinion-wheel D', cross-head $D^2$, and plunger D, whereby said plunger is moved forward to press the end of the article, as set forth.

5. In a press or machine of the character described, the shaft F', provided with the pinion-wheel $F^5$ and intermediate gearing adapted to engage with the mutilated gear-wheel $F^6$ on the shaft E, and the crank-arm F, secured to the other end of the shaft F', in combination with the link $f$, rocking lever $f'$, pitman $f^3$, and plunger D, whereby said plunger is thrust forward to eject the article from the machine, as set forth.

6. In a press or machine of the character described, the swinging arm $h'$, provided with the movable jaw $h^2$, and devices, substantially as described, for operating the arm and jaw, whereby one end of the bar $h$ is placed centrally in the mold-cavity and held firmly in such position until the base is pressed thereon, as set forth.

In testimony whereof I affix my signature in presence of two witnesses.

CHARLES S. LONG.

Witnesses:
H. D. WAGNER,
O. M. TANNER.